US009226608B2

(12) United States Patent
Cotter et al.

(10) Patent No.: US 9,226,608 B2
(45) Date of Patent: Jan. 5, 2016

(54) GARLIC PRESS

(75) Inventors: Jennifer Cotter, Seattle, WA (US); Lance Hood, Seattle, WA (US); Joshua Stewart, Seattle, WA (US); Scott Jarnagin, Seattle, WA (US)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 676 days.

(21) Appl. No.: 13/547,344

(22) Filed: Jul. 12, 2012

(65) Prior Publication Data

US 2013/0092771 A1     Apr. 18, 2013

Related U.S. Application Data

(60) Provisional application No. 61/547,465, filed on Oct. 14, 2011.

(51) Int. Cl.
*A47J 19/06* (2006.01)
*B26D 3/26* (2006.01)

(52) U.S. Cl.
CPC ... *A47J 19/06* (2013.01); *B26D 3/26* (2013.01)

(58) Field of Classification Search
CPC ..... A47J 19/06; A47J 43/082; A47J 43/1081; A47J 43/00; A47J 19/00; A47J 19/005; A47J 19/04; A47J 2043/04409; A47J 2043/04427; A47J 9/002–9/006; B30B 9/04; B30B 9/06; B30B 1/04; B26D 3/26; B26D 5/22; Y10T 83/501

USPC .............. 30/114–117; 83/437.2; 99/495, 509, 99/510; 100/116, 234, 243, 288; 241/84, 241/95, 169, 169.2

See application file for complete search history.

(56) References Cited

U.S. PATENT DOCUMENTS

| | | | |
|---|---|---|---|
| 2,737,721 A * | 3/1956 | Hart | 83/437.5 |
| 7,302,887 B1 * | 12/2007 | Chapman et al. | 100/234 |
| D664,813 S * | 8/2012 | Cotter et al. | D7/666 |
| 2007/0119314 A1 | 5/2007 | Acker, Jr. | |
| 2009/0272281 A1 * | 11/2009 | Hood et al. | 99/538 |
| 2011/0067583 A1 | 3/2011 | Peronti et al. | |
| 2013/0232799 A1 * | 9/2013 | Schmidt et al. | 30/272.1 |

OTHER PUBLICATIONS

Microplane, Garlic Mincer Tool Instructions (Aug. 4, 2014).*

* cited by examiner

*Primary Examiner* — Alexander P Taousakis
*Assistant Examiner* — Leonel Vasquez
(74) *Attorney, Agent, or Firm* — Lowe Graham Jones PLLC

(57) ABSTRACT

A garlic press includes a ratchet body pivotally connected to a main body and biased away from the main body. A pusher is coupled to a ratchet rack, with a pawl engaging the ratchet rack to incrementally urge the pusher downward through the ratchet body and toward a grid of blades. A slicing blade attached to the main body slices bits of garlic pushed through the grid of blades.

17 Claims, 6 Drawing Sheets

GARLIC PRESS

PRIORITY CLAIM

This application claims the benefit of provisional application Ser. No. 61/547,465 filed Oct. 14, 2011, the contents of which are incorporated by reference.

FIELD OF THE INVENTION

This invention generally relates to devices for crushing or mincing garlic.

BACKGROUND OF THE INVENTION

Existing garlic mincers typically employ a cylinder and a piston for pressing garlic though the cylinder and further through a grate to mince the garlic. The piston and cylinder arrangement are operated by a pair of arms that are squeezed together in the hand of the user, with no mechanical advantage. In addition, if a large clove or multiple cloves are placed in the cylinder, the arms are separated at a distance that can make it very difficult to force them together, thereby making it a challenge to mince the garlic. Consequently, with current garlic mincers it is physically difficult to mince garlic, and efforts to make it easier end up taking more time by requiring the insertion of a single clove at a time.

SUMMARY OF THE INVENTION

The exemplary garlic cutter as described below includes a ratchet housing body that is pivotally mounted to a base. The ratchet body is biased away from the base so that a user may use a hand to pull the ratchet body toward the base in a repeated manner. Within the ratchet body a pusher is guided by a ratchet rack towards a grid of blades, in which repeated pivotal motion of the ratchet body with respect to the base causes the ratchet rack and the pusher to move toward the grid of blades. Cloves of garlic or similar items positioned between the pusher and the grid of blades are pushed through the grid of blades and thereby minced or chopped accordingly.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
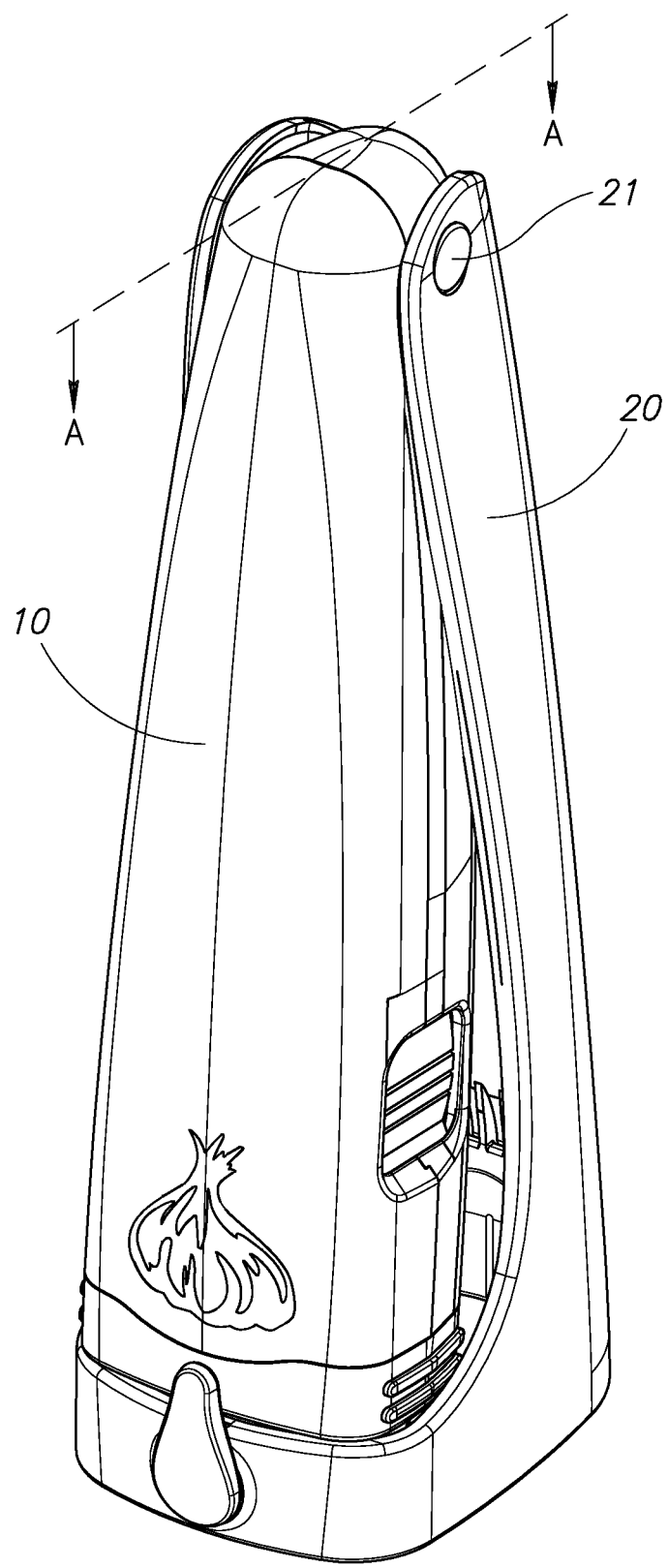
FIG. 1 is a perspective view of a preferred version of a garlic press, shown in a closed position.

With reference to FIGS. 1-6, a preferred version of a garlic press is illustrated and described below. The preferred garlic press includes a ratchet housing 10 mounted to a base or main body 20. The base is preferably formed with a floor 23 having surrounding upright sidewalls that define a cavity or receptacle 22 for containing bits of minced or chopped garlic. The base further includes elongated opposing upright sidewalls 24, 25, with a back wall 26 between them. The upright and back wall define an elongated open area for receiving the ratchet housing. An upper end of each of the upright sidewalls includes a bore for supporting an axle 21, such that the ratchet housing is carried on the axle for pivotal movement into and away from the main body and the elongated open area.

A pawl 30 is mounted to the back wall of the base, preferably at a location about mid-way between the bottom and the top of the back wall. The pawl includes a pivot end positioned adjacent the back wall, and an opposite working end configured as a finger for engaging the ratchet teeth of the rack, as described further below. The pawl finger is angled outward slightly, away from the back wall of the base when the pawl is mounted. The pawl is mounted via a pawl mount 34, which in the illustrated example is in the form of a pair of parallel U-shaped braces spaced apart from one another and carried on a back plate. The back plate is received within a corresponding recess on the back wall and held in place via glue, sonic welding, or other means.

Figure 6:
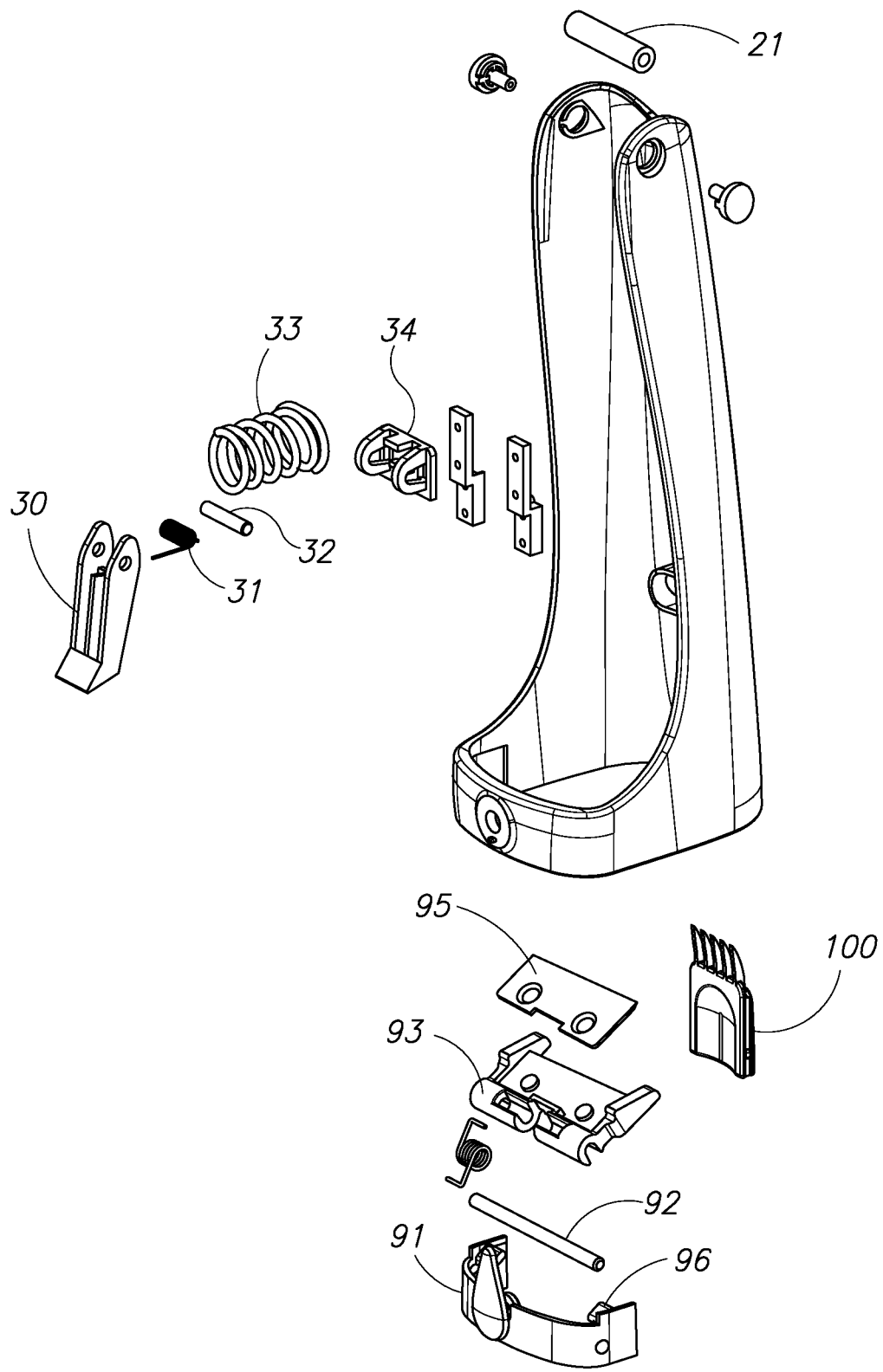
FIG. 6 is an exploded view of a main body of a preferred garlic press.

A pawl pin 32 is supported within the U-shaped braces, and further receives opposing upright tabs formed in the pawl 30 as best shown in FIG. 6. A torsion pawl spring 31 is also carried on the pawl pin, with one free end adjacent a back side of the pawl and a second free end adjacent the back wall of the base. Accordingly, with the pawl mounted in place the pawl spring urges the pawl away from the back wall and toward the rack.

A ratchet housing spring, or main body spring 33 is further mounted to the back wall of the base and positioned to engage the ratchet housing as the ratchet housing pivots toward the back wall of the base. The ratchet housing spring will thereby urge the ratchet housing away from the back wall so that it will automatically move away from the base when the user releases it after the ratchet housing toward the base. A pivotal lock 29 is positioned at the base of the main body and configured to rotate into a first position to prevent the ratchet body from pivoting away from the main body, and to a second position allowing the ratchet body to pivot away from the main body.

Figure 5:
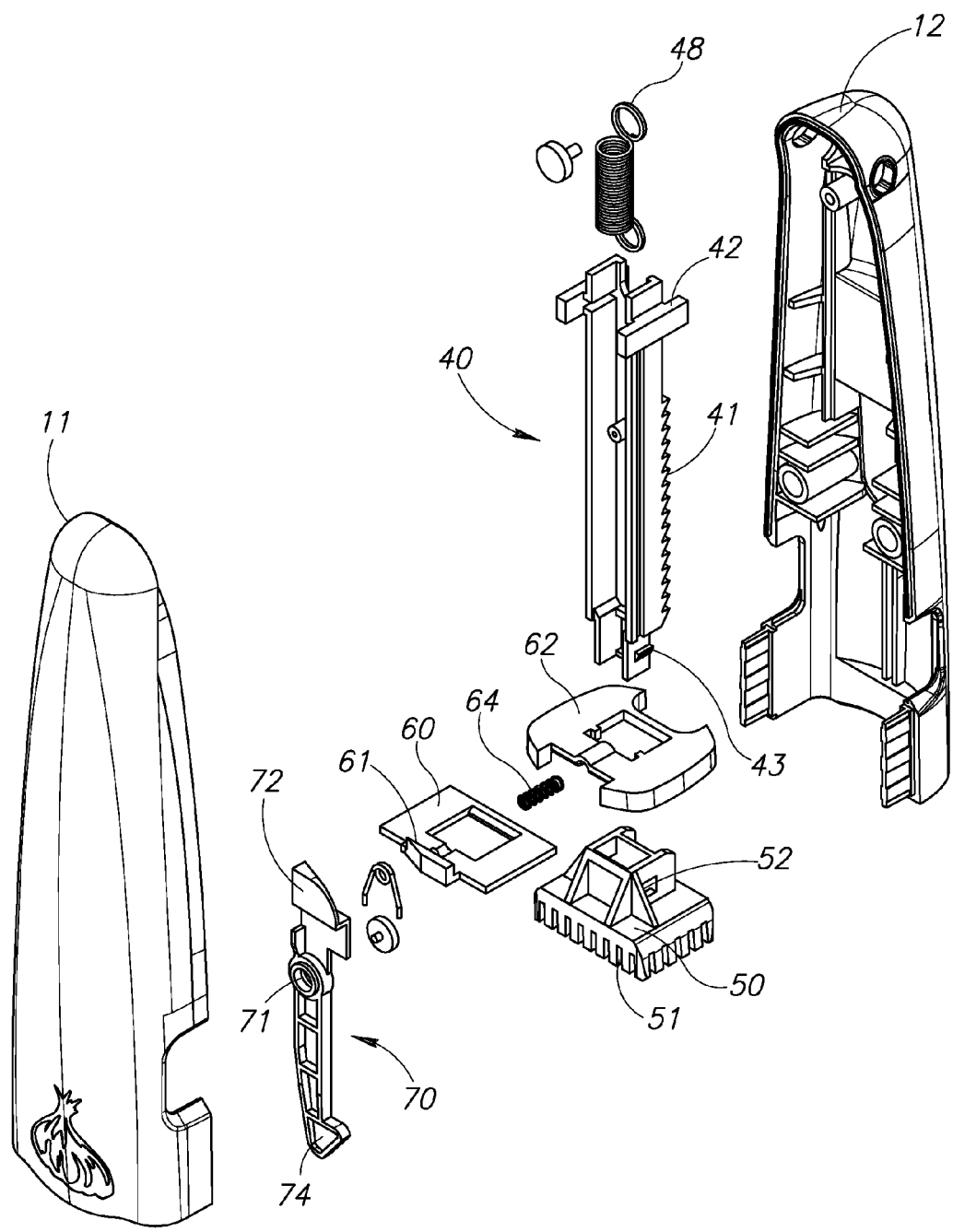
FIG. 5 is an exploded view of a ratchet housing of a preferred garlic press.

As best seen in FIG. 5, the ratchet housing is preferably formed with two outer casing halves 11, 12, which join together to house the internal ratchet and pusher members for urging garlic through a grid of blades. The ratchet housing supports the ratchet rack 40, which is formed with a plurality of ratchet teeth 41 extending vertically along a frame of the ratchet rack. Viewed in a horizontal cross-section, the preferred ratchet rack is formed as a U-shape, with the ratchet teeth extending outward from the base of the U.

At the top of each side of the ratchet rack (that is, along each upright of the U) a guide 42 is formed. In the illustrated version the guide is in the shape of a horizontal bar. The guide serves to align the ratchet rack within the housing as the ratchet tack travels vertically downward within the housing, and also serves to limit the downward path of travel of the ratchet rack by engaging one or more surfaces formed on the interior of the ratchet housing.

A rack spring 48 further biases the ratchet rack toward the upper end of the ratchet housing. As shown, the exemplary rack spring is a coil spring having a first end attached to an internal peg formed on the inside of one of the ratchet housing halves. The opposite end of the coil spring is attached to an upper end of the ratchet rack.

The lower end of the ratchet rack is attached to a pusher 50. The pusher includes a plurality of projections 51 that are sized and configured to fit between openings in a grid of blades, as described below. Consequently, the pusher pushes the cloves of garlic through the grid of blades so that they are chopped or minced. The pusher may be integrally formed with the ratchet rack or, in the preferred example, may be separately formed and attached to it. As illustrated, the lower end of the ratchet rack includes a pair of opposing fingers 43 that engage a corresponding pair of openings 52 formed in a mounting structure of the pusher. The fingers are configured such that they deform inward under force to allow the pusher to be attached to or removed from the ratchet rack.

A ratchet lock release 60 and rack lock plate 62 are positioned within the ratchet housing to lock the ratchet rack in position, preventing a return to its upward position as urged by the rack spring, as the ratchet rack travels downward. The ratchet lock plate is formed as a horizontal plate having a central opening that is sized to allow the ratchet rack to travel through the opening. The rack lock plate includes a peripheral skirt that provides structural rigidity and facilitates the attachment of the rack lock plate to interior walls within the ratchet housing.

The rack lock release is carried by the rack lock plate for horizontal sliding movement of the rack lock release adjacent the rack lock plate. As with the rack lock plate, the rack release lock includes a central opening sized to allow the ratchet rack to travel through it. A lock plate spring 64 is supported at a first end by a peg formed within the rack lock plate and at a second end by a peg formed on the rack lock release. The lock plate spring is positioned to bias the rack lock release in a horizontal direction that partially closes the opening for receiving the ratchet rack. One side of the opening within the rack lock release, opposite the peg receiving the lock plate spring, is formed with a ramp surface that is complementary to the shape of the teeth formed on the ratchet rack. Thus, the ramp engages the rack teeth to limit upward travel of the ratchet rack. The lock plate spring further biases the lock release in the locking position, thereby locking the ratchet rack in position against the lock release. As the rack moves downward, the teeth of the rack progressively slide over the rack lock release and each progressive tooth is held in place by the rack lock release. When the spring is compressed by application of a force against the rack lock release, the ramp disengages the ratchet rack teeth, allowing the rack spring 48 to pull the ratchet rack upward to its resting position.

A trigger 70 provides a mechanism for automatically releasing the ratchet rack by moving the rack lock release and compressing the lock plate spring. The trigger is pivotally mounted to the ratchet housing at a central pivot point 71. The trigger further includes an upper vertical cam surface 72 that is thinner at a first end and thicker at a second end. When assembled, the cam surface 72 rests against a ramp 61 formed on the rack lock release. Pivotal movement of the trigger causes the cam 72 to slide along the ramp 61, thereby pushing the rack lock release horizontally away from the upper end of the trigger. As explained above, the sliding movement of the rack lock release causes disengagement with the ratchet teeth and return of the ratchet rack to its resting position.

A container 80 (best seen in FIG. 4) is removably secured to the lower end of the ratchet housing. The container includes upright sidewalls 81 forming an interior space for receiving one or more cloves of garlic to be chopped. A grid of blades 82 is mounted to a lower end of the container, and in the version as shown the grid of blades includes a first plurality of parallel blades and a second plurality of parallel blades in which the second plurality is perpendicular to the first plurality. An end cap 83 traps the grid of blades between the lower end of the sidewalls and the end cap. In the illustrated example, the lower end of the sidewalls and the end cap may include internal projections to provide a firm surface for receiving the grid of blades.

The container further includes a container lock 85 to retain the container within the ratchet housing. In the illustrated example, the container lock is formed as a slightly outwardly extending projection integrally formed with the container and having a living hinge at one end. A force exerted against the container lock forces it inward, toward the interior of the container, such that the container lock is substantially flush with the outer surface of the container sidewall forming the container lock. The ratchet housing includes an opening that is sized and positioned to receive the container lock, such that when the container is inserted into the ratchet housing the container lock is positioned outward and rests against a shoulder formed by the opening in the ratchet housing. To remove the container from the housing, a force is exerted against the container lock to press it inward, clearing the shoulder formed by the opening and allowing the container to be removed. In the preferred version of the invention, a pair of container locks is provided on opposing sides of the container. Likewise, a pair of openings is provided within the housing to receive a corresponding one of the container locks.

A stem 86 is formed at an upper end of the container. Most preferably, the stem includes an outer surface that angles upwardly and outwardly as the stem extends away from the upper end of the container. The stem is sized and configured to engage a lower end of the trigger 70 when the container is inserted into the housing.

The lower end of the trigger includes a foot 74 having a distal end forming an angled outer surface. The angled outer surface extends along a line approximately forty-five degrees with respect to the vertical axis of the trigger. The stem on the container is sized and positioned such that, when the container is inserted into the housing, the stem will contact the lower side of the foot 74 before the container is fully inserted into the housing. As the container is further pushed upward into the housing the stem slides along the angled surface of the foot 74, causing the trigger to pivot somewhat about the pivot point 71. In turn, this pivoting action moves the cam 72 against the ramp 61, pushing the rack lock release inward and disengaging the ratchet rack. Consequently, insertion of the container automatically causes the ratchet rack to return to its resting position toward the upper end of the ratchet housing.

In use, one or more cloves of garlic (or other food items to be minced) are placed in the container. The container is then inserted into the ratchet housing as described above, causing the ratchet rack and pusher to move upward, away from the container.

The user then grips the ratchet housing and the base, squeezing the ratchet housing toward the base. As the ratchet housing is pivoted toward the base, the pawl engages a first tooth on the ratchet rack, locking the pawl against the corresponding tooth. Further pivotal movement of the ratchet housing toward the base causes continued pivotal movement of the pawl, which in turn urges the ratchet rack downward. This downward movement of the ratchet rack likewise causes the pusher to move downward, pushing the garlic into the grid of blades.

The teeth of the ratchet rack also engage the ratchet lock release as they travel downward, such that when the pawl moves the ratchet rack downward the ratchet lock release prevents upward travel of the ratchet rack. As the user releases pressure of the ratchet housing the ratchet housing spring urges the ratchet housing away from the base. Meanwhile, as described above, the ratchet rack remains in position. Continued squeezing and releasing of the ratchet housing toward the base causes the pawl to continue to incrementally move the ratchet rack downward, and therefore move the pusher toward the grid of blades. Correspondingly, the cloves of garlic are pushed through the blades.

Figure 2:
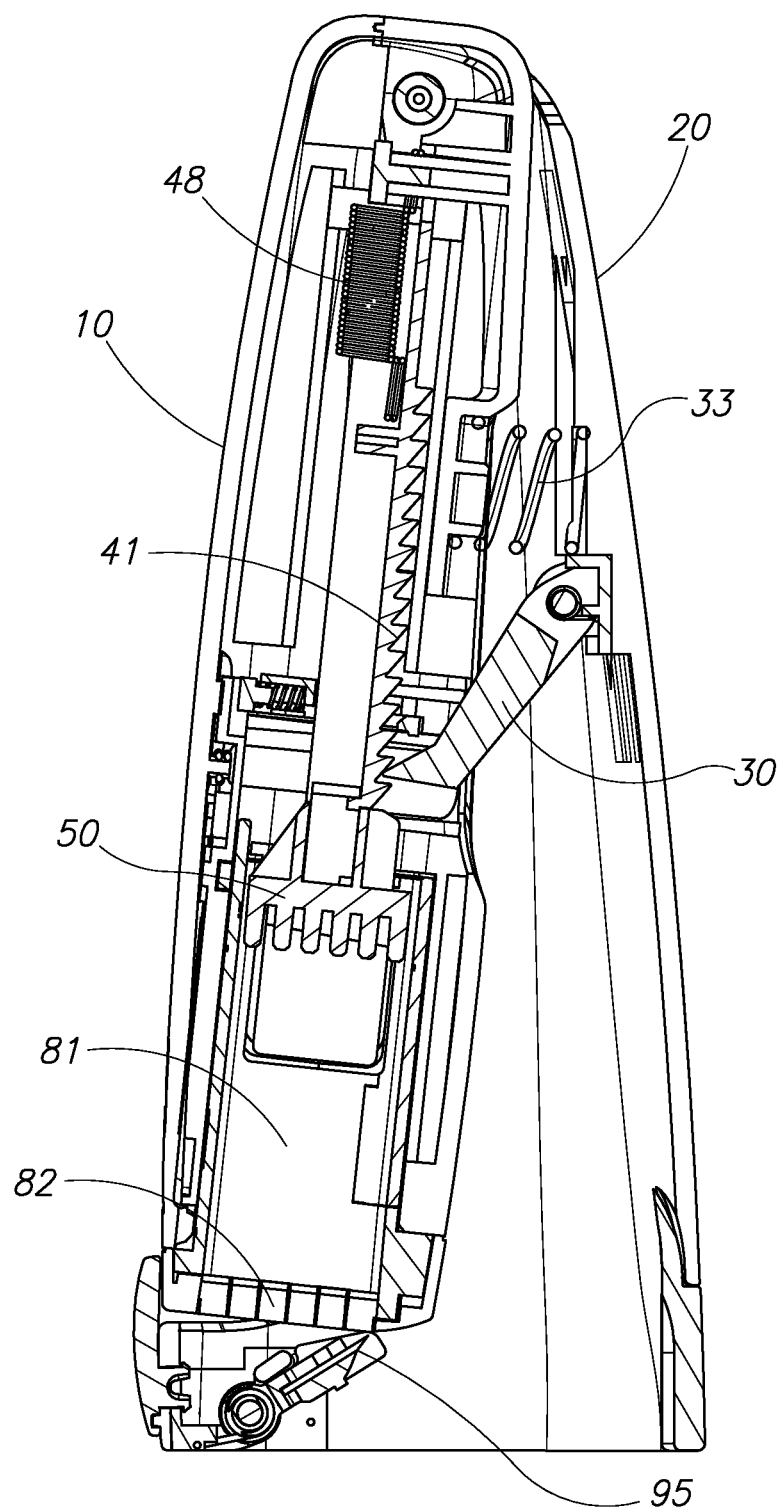
FIG. 2 is a sectional view of a preferred garlic press, taken along line A-A in FIG. 1.
Figure 3:
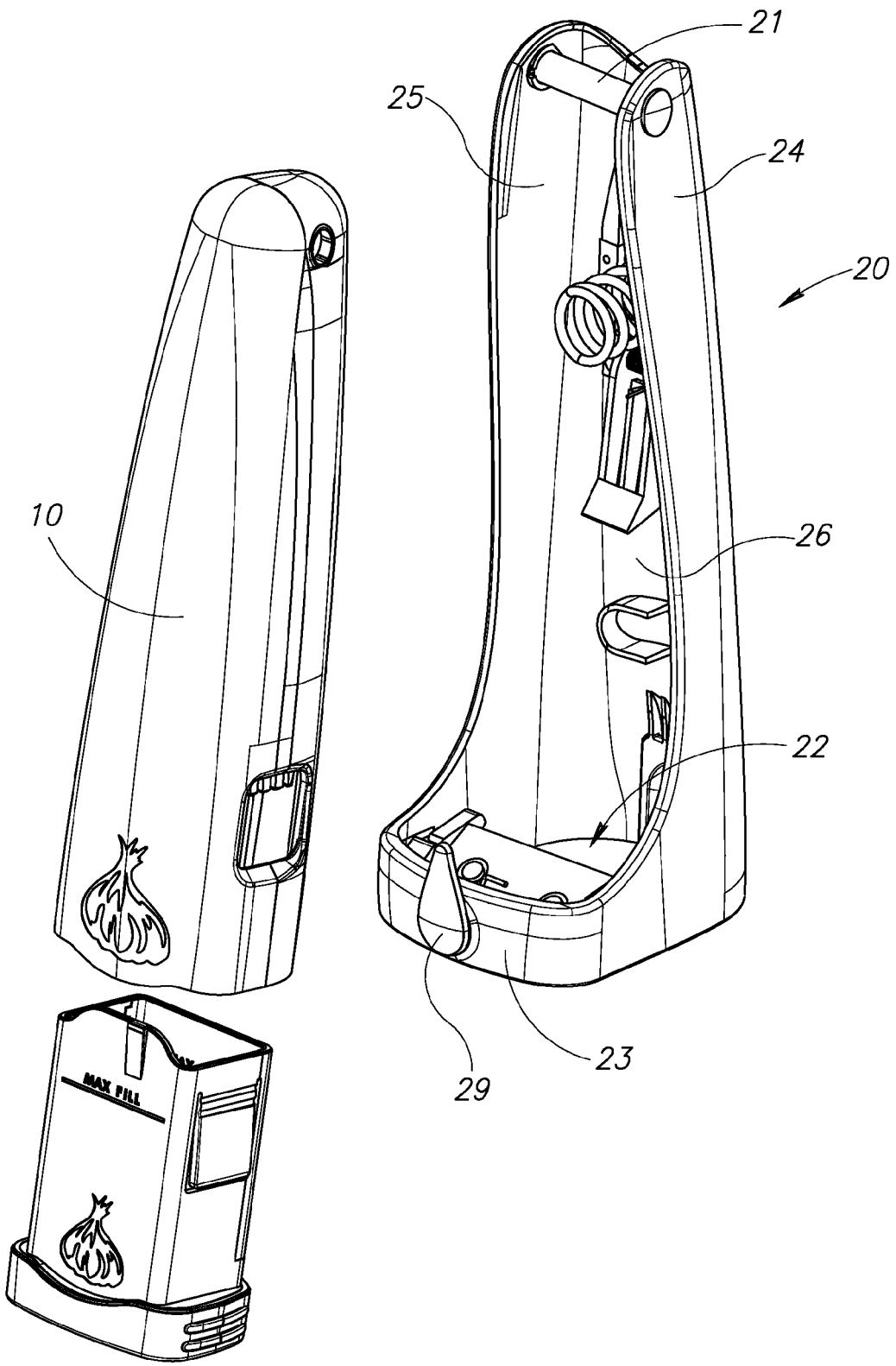
FIG. 3 is a partially exploded view of a preferred garlic press.
Figure 4:
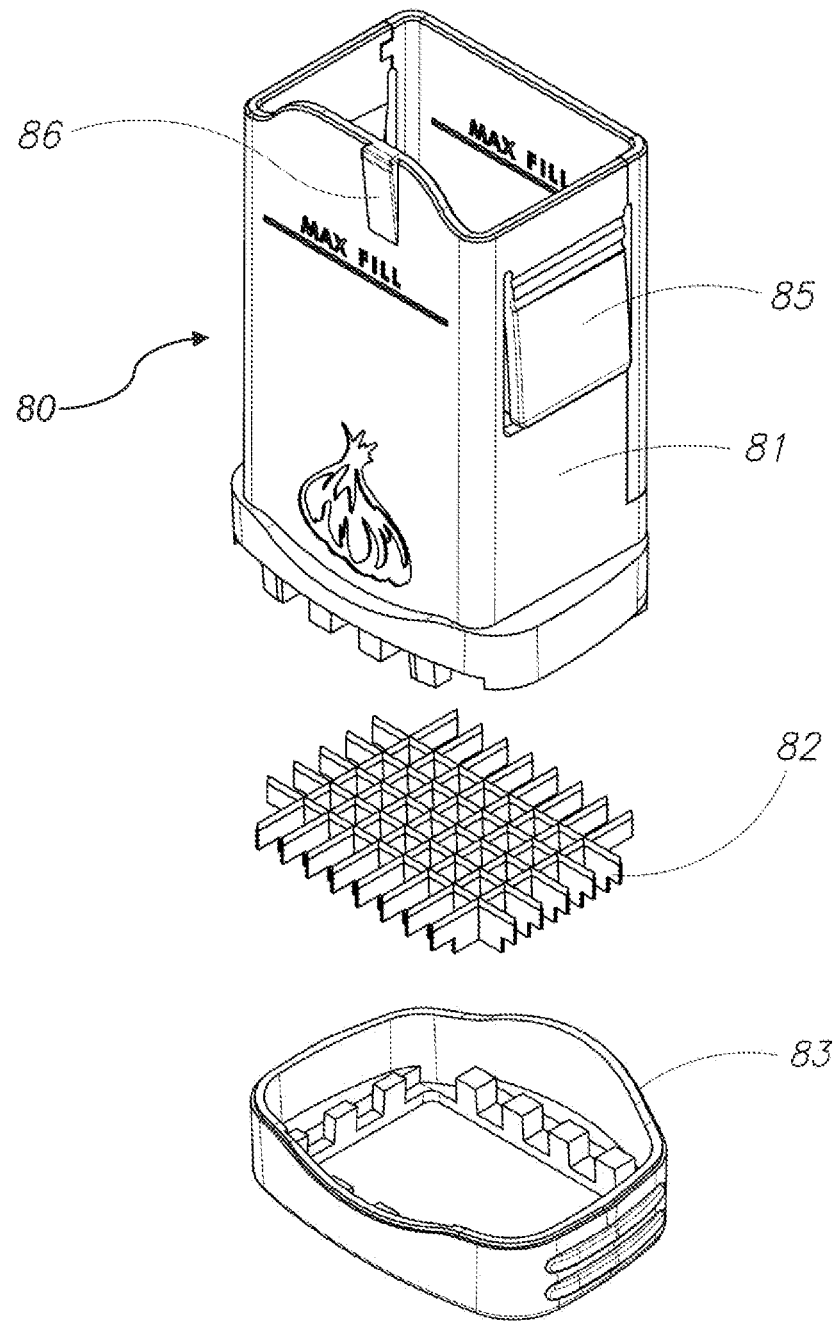
FIG. 4 is a partially exploded view of a garlic container for use with a preferred garlic press.

As best seen in FIGS. 2 and 6, the bottom of the container, a slicing blade 95 slices the bits of garlic off as they are pushed through the grid of blades, thereby producing small minced pieces. A slicing blade frame 91 is shaped to be secured to a front portion of the base 20. The slicing blade frame 91 includes a pin 92 that is held within a pair of recesses within the slicing blade frame. The pin carries a slicing blade table 93, which secures to the sliding blade 95. Thus, the slicing blade and table are mounted for pivotal movement about the pin held within the slicing blade frame. A pair of stops 96 formed on the slicing blade frame are positioned to limit pivotal travel of the slicing blade beyond an angle inclined above the horizontal, and preferably at about 30 to 40 degrees above the horizontal. The slicing blade is also positioned to rest adjacent the lower edge of the grid of blades. Accordingly, as the ratchet housing and grid of blades pivots outward away from the base the slicing blade scrapes against it, cutting the bits of garlic that have been pushed beyond the grid of blades. A user may optionally rotate the slicing blade outward and away from the base, thereby disengaging it from the grid of blades.

When mincing is completed, the user may clean the grid of blades with a comb 100. The comb has individual teeth that are sized to fit within the openings in the grid of blades to push any remaining bits through the grid.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A garlic press, comprising:
   a ratchet body having an outer housing defining an interior space sized and configured to receive a clove of garlic;
   a grid of blades spanning the interior space;
   a pusher positioned within the housing for axial movement toward the grid of blades, the pusher being coupled to a ratchet rack;
   a main body pivotally attached to the ratchet body for pivotal movement of the main body with respect to the ratchet body; and
   a pawl attached to the main body, the pawl positioned on the main body to engage the ratchet rack when the ratchet body is pivotally moved toward the main body; and
   a slicing blade carried on the main body, the slicing blade being positioned to scrape against the grid of blades as the ratchet body is pivoted toward the main body
   whereby pivotal movement of the main body with respect to the ratchet body causes the pawl to engage the ratchet rack and thereby move the pusher axially toward the grid of blades, pushing the clove of garlic through the grid of blades.

2. The garlic press of claim 1, wherein the slicing blade is pivotally attached to the main body, the garlic press further comprising a slicing blade spring coupled to the slicing blade to urge the slicing blade in a direction toward the grid of blades.

3. The garlic press of claim 1, wherein the pawl is pivotally attached to the main body.

4. The garlic press of claim 3, further comprising a pawl spring connected to the pawl and configured to urge the pawl away from the main body.

5. The garlic press of claim 3, further comprising a main body spring attached to at least one of the main body or the ratchet body, the main body spring being configured to urge the ratchet body pivotally away from the main body.

6. The garlic press of claim 1, wherein the grid of blades is removable from the ratchet body, whereby removal of the grid of blades enables insertion of the clove of garlic into the interior space.

7. The garlic press of claim 6, further comprising a removable container secured within the interior space, the grid of blades being attached to the removable container.

8. The garlic press of claim 1, further comprising a ratchet lock carried on the ratchet body and positioned prevent movement of the ratchet rack away from the grid of blades, and further comprising a ratchet lock release carried on the ratchet body, the ratchet lock release being configured to release the ratchet lock and thereby allow movement of the ratchet rack and the pusher away from the grid of blades.

9. The garlic press of claim 8, further comprising a comb having teeth configured to fit within the grid of blades, the comb being removably attached to the main body.

10. A garlic press, comprising:
    a ratchet body formed by a housing;
    a grid of blades supported by the ratchet body;
    a pusher carried by the housing for axial movement toward the grid of blades;
    a main body pivotally attached to the ratchet body for pivotal movement of the main body with respect to the ratchet body;
    a ratchet rack formed on one of the pusher or the main body;
    a pawl attached to the other of the pusher or the main body, the pawl being positioned to engage the ratchet rack when the ratchet body is pivotally moved toward the main body; and
    a slicing blade carried on the main body, the slicing blade being positioned to scrape against the grid of blades as the ratchet body is pivoted toward the main body; whereby pivotal movement of the main body with respect to the ratchet body causes the pawl to engage the ratchet rack and thereby move the pusher axially toward the grid of blades.

11. The garlic press of claim 10, wherein the slicing blade is pivotally attached to the main body, the garlic press further comprising a slicing blade spring coupled to the slicing blade to urge the slicing blade in a direction toward the grid of blades.

12. The garlic press of claim 10, wherein the pawl is pivotally attached to the main body.

13. The garlic press of claim 12, further comprising a pawl spring connected to the pawl and configured to urge the pawl away from the main body.

14. The garlic press of claim 10, further comprising a main body spring attached to at least one of the main body or the ratchet body, the main body spring being configured to urge the ratchet body pivotally away from the main body.

15. The garlic press of claim 10, wherein the grid of blades is removable from the ratchet body.

16. The garlic press of claim 15, further comprising a removable container secured to the ratchet body, the grid of blades being attached to the removable container.

17. The garlic press of claim 10, further comprising a ratchet lock carried on the ratchet body and positioned prevent movement of the ratchet rack away from the grid of blades, and further comprising a ratchet lock release carried on the ratchet body, the ratchet lock release being configured to release the ratchet lock and thereby allow movement of the ratchet rack and the pusher away from the grid of blades.

* * * * *